May 5, 1925.
E. G. ANDERSON ET AL
1,536,742
RAKE ATTACHMENT
Filed April 24, 1924
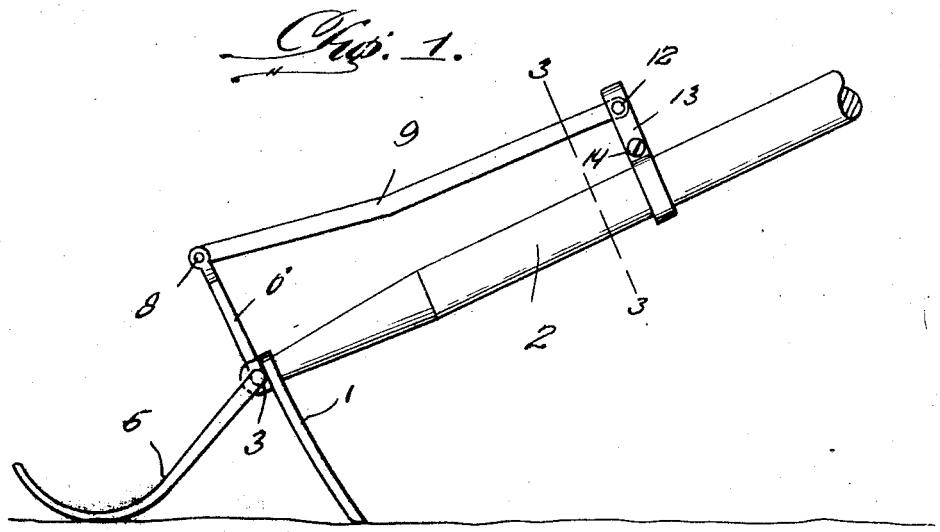
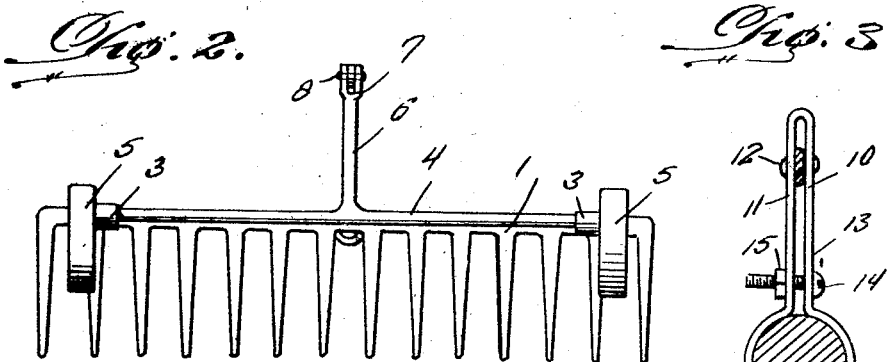
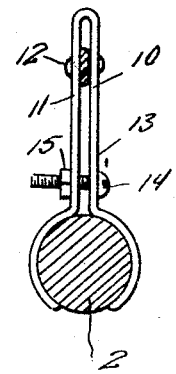
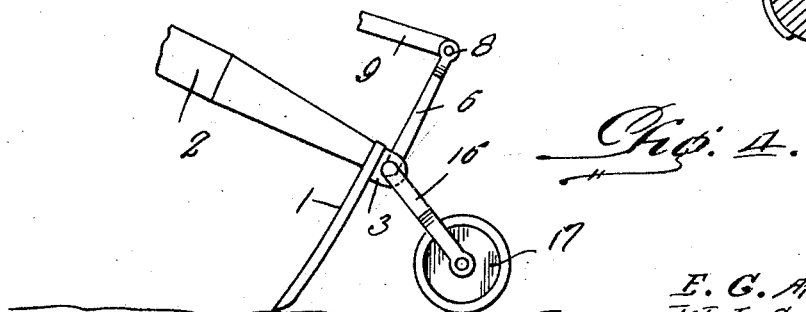
Inventors
E. G. Anderson,
W. J. Gratrick
By Clarence A. O'Brien
Attorney Patented May 5, 1925.

1,536,742

UNITED STATES PATENT OFFICE.

ERNEST G. ANDERSON AND WILLIAM J. GRATRICK, OF MINNEAPOLIS, MINNESOTA.

RAKE ATTACHMENT.

Application filed April 24, 1924. Serial No. 708,816.

*To all whom it may concern:*

Be it known that we, ERNEST G. ANDERSON and WILLIAM J. GRATRICK, citizens of the United States, residing at Minneapolis, in the county of Hennepin and State of Minnesota, have invented certain new and useful Improvements in Rake Attachments, of which the following is a specification.

This invention relates to new and useful improvements in attachments for rakes and is more particularly adapted to a gage means therefor.

One of the important objects of the present invention is to provide an attachment for a rake which will render the raking of a lawn or garden very uniform, and will further prevent the pulling up of the roots of the grass, or crops which have been planted, when the rake is in use.

A still further object of the invention is to provide a gage attachment for a rake, wherein the same is adapted for various adjustments, so as to regulate the depth at which the rake will operate over the surface of the ground.

A still further object of the present invention is to provide a rake attachment of the above mentioned character, which is simple in construction, inexpensive, strong and durable, and further well adapted for the purposes for which it is designated.

Other objects and advantages of this invention will become apparent during the course of the following description:

In the accompanying drawing, forming a part of the specification, and in which like numerals designate like parts throughout the same:

Figure 1 is a side elevation of our gage attachment, showing the same in position on a rake.

Figure 2 is a front end elevation thereof.

Figure 3 is a sectional view, taken on the line 3—3 of Figure 1, and

Figure 4 is a fragmentary front elevation of a modification of the present invention.

In the drawing, wherein for the purpose of illustration is shown the preferred embodiment of our invention, the numeral 1 designates a garden rake which is of the usual construction and provided with the ordinary handle 2. Formed on the upper portion of the rake 1 adjacent the respective ends thereof are the forwardly extending apertured ears 3, and adapted to be supported thereby is the elongated rod or rock shaft 4. This shaft 4 extends longitudinally through the bearing openings in the ears 3, and the outer lateral ends thereof terminate in the curved arms or shoes 5, in a manner as clearly shown in Figures 1 and 2 of the drawings.

The arms 5, which are curved at their outer ends, are substantially flat, and extend downwardly in the manner as clearly shown. Extending upwardly from the intermediate portion of the rod or shaft 4 is the extension 6, the upper end of which is bifurcated, as shown at 7, and in which is pivotally supported, by means of the transversely extending pin 8, the forward end of the elongated lever 9. The lever 9 extends rearwardly over the forward end of the handle 2, and is connected at its rear end between the upper portions of the arms 10 and 11, as shown at 12. The arms 10 and 11 comprise a clamping member, and the free ends of the arms are disposed around the handle 2, in the manner as more clearly shown in Figure 3 of the drawing. For the purpose of holding the clamping member, designated in the drawing by the numeral 13, in position on the handle, I provide the fastening bolt 14 and the cooperating nut 15.

The clamping member 13 provides a means whereby the curved arms 5 are supported on the rake head, and may be adjusted to various positions with respect to the rake head, by moving the clamping member in either direction on the handle. This is accomplished by fastening the nut 15 and enabling the arms 10 and 11 respectively, to freely slide off the handle.

In Figure 4 of the drawings, a modification of the present invention is shown, wherein the ends of the rod or shaft 4, extend beyond the ears 3, and terminate in the downwardly extending arms 16, and on the lower ends of which are supported rotary shoes or rollers which are shown at 17. The rollers 17 are adapted to be adjusted with respect to the rake heads in the same manner as the curved arms 5, and a further detailed description of the same is not thought necessary.

The provision of an attachment of the above mentioned character provides a gage in connection with the rake, whereby the depth at which the rake is adapted to operate may be regulated, and in such a manner as to prevent the grass or growing crops from being disrupted. Furthermore, the lawn and garden may be raked in a more uniform manner with a gage attachment of the character associated with the rake head.

The simplicity of our attachment enables the same to be readily and easily adjusted to the proper position, and will efficiently carry out the purposes for which it is designated. Furthermore, an attachment of this character may be readily and easily placed on the ordinary rake now in use, and will be inexpensive and yet strong and durable.

While we have shown the preferred embodiment of our invention, it is to be understood that various changes in the shape, size and arrangement of parts may be resorted to, without departing from the spirit of our invention or the scope of the appended claims.

Having thus described our invention, what we claim is:

1. In combination with a rake and the handle thereof, of a gage associated therewith comprising a shaft extending longitudinally on the head of said rake and adapted for rotary movement thereon, gage elements formed on the outer ends of said shaft and extending forwardly and downwardly therefrom, a projection extending upwardly from the intermediate portion of said shaft, a lever connected to the upper end of said projection, and extending rearwardly over said handle, and an adjustable clamp supported on the handle and connected to the opposite end of said lever.

2. A device of the class described comprising a rake head provided with forwardly projecting ears having bearing openings, a rock shaft journaled for rotation in said bearing openings, the opposite ends of said shaft being directed forwardly and downwardly and being provided at their free ends with ground engaging shoes, a lever integral with and rising from the central portion of said rock shaft, and means for moving said lever and maintaining it in a set position.

In testimony whereof we affix our signatures.

ERNEST G. ANDERSON.
WILLIAM J. GRATRICK.